Oct. 26, 1954          G. E. FLURSCHUTZ          2,692,760
            YIELDINGLY MOUNTED CIRCUMFERENTIAL SEAL
Original Filed Oct. 6, 1949                   2 Sheets-Sheet 1
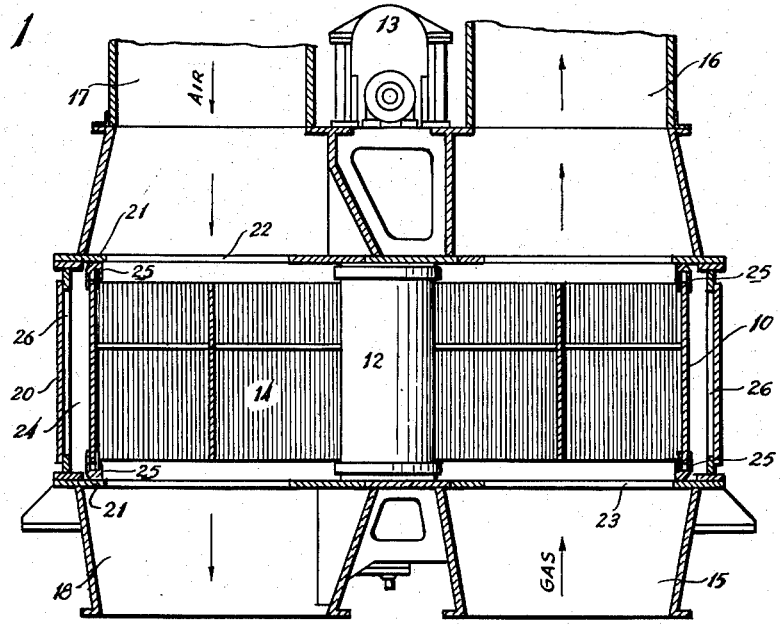
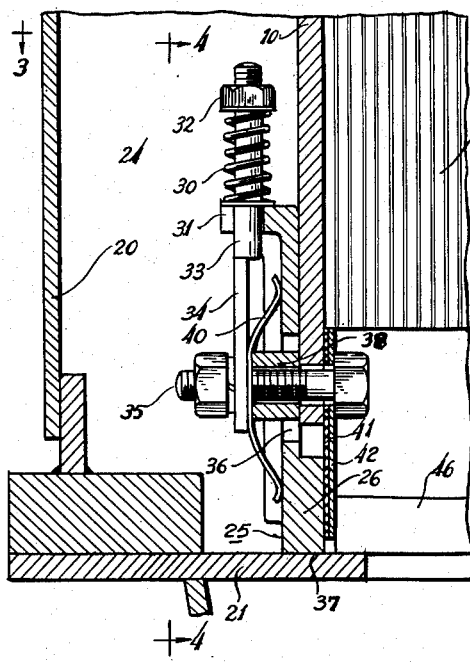
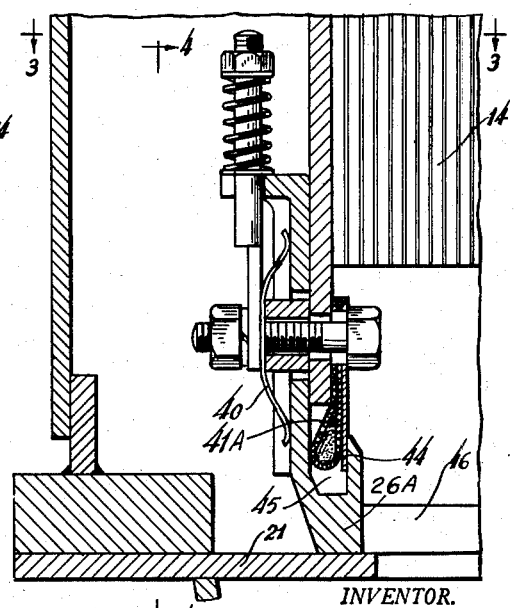
INVENTOR.
Glenn E. Flurschutz
BY
ATTORNEY

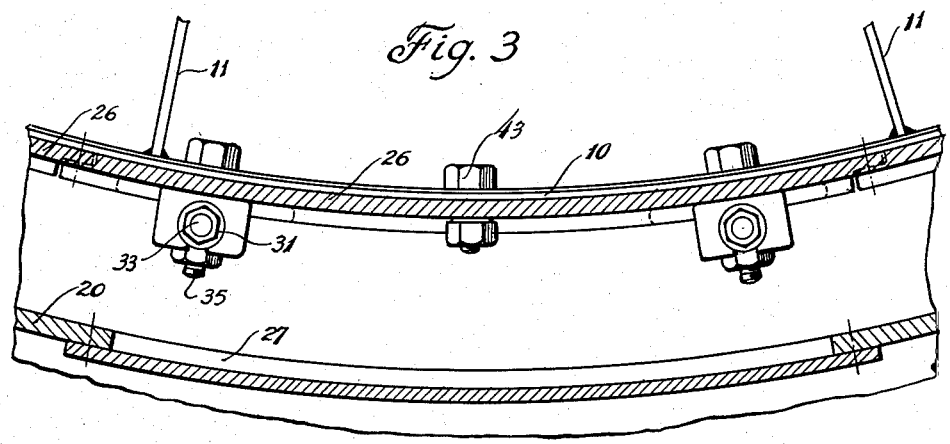
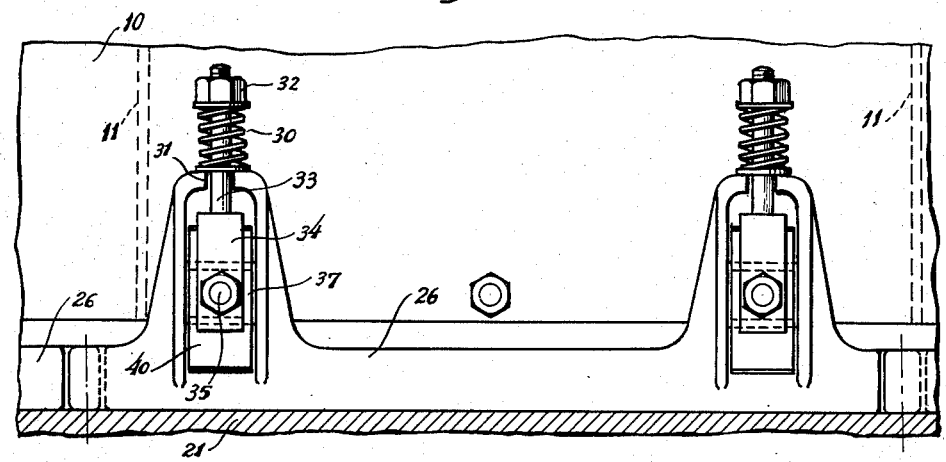

Patented Oct. 26, 1954

2,692,760

UNITED STATES PATENT OFFICE 2,692,760

YIELDINGLY MOUNTED CIRCUMFERENTIAL SEAL

Glenn E. Flurschutz, Wellsville, N. Y., assignor to The Air Preheater Corporation, New York, N. Y.

Substituted for abandoned application Serial No. 119,843, October 6, 1949. This application April 30, 1953, Serial No. 352,179

5 Claims. (Cl. 257—6)

The present invention relates to rotary regenerative air preheaters or like apparatus and particularly to improved circumferential seals for use between the rotor and enclosing housing.

In a rotary regenerative heater of the Ljungstrom type a cylindrical rotor has compartments that carry metallic heat transfer plates which as the rotor turns are first exposed to the heating gases and then disposed in the air passage to impart the absorbed heat to the air. The rotor is surrounded by a housing having end or sector plates formed with openings to provide for the flow of gas and air and in order to preclude the flow of gas or air through the clearance space between the rotor and housing in a way to by-pass the heat transfer material it is customary to provide the rotor with circumferential seals that bear against the sector plates or other stationary parts.

The present invention contemplates improved circumferential sealing devices of novel forms that float with respect to the sector plates of the housing, being yieldingly mounted on the ends of the rotor as will best be understood upon consideration of the following detailed description of several illustrative embodiments thereof when read in conjunction with the accompanying drawings in which:

Figure 1 is a sectional elevational view in diagrammatic form of a rotary regenerative air preheater embodying the present invention;

Figures 2 and 5 are enlarged sectional elevational views showing the detailed construction of components of two types of the sealing devices;

Figure 3 is a fragmentary sectional view on the line 3—3 in Figure 2 or Figure 5; and Figure 4 is an elevational view corresponding to Figure 3 as seen on line 4—4 in Figure 2 or Figure 5.

In the drawings the numeral 10 designates the cylindrical shell of a rotor that is divided into sector shaped compartments by radial partitions 11 connecting it with the rotor post 12 which is driven by a motor and reduction gearing 13 to turn the rotor slowly about its axis. The rotor compartments contain regenerative heat transfer material in the form of metallic plates 14 spaced to provide passages for the flow of gases from which they first absorb heat. The hot gases enter the preheater through a duct 15 from a boiler or other source and are discharged after passing over the heat transfer plates 14 through an outlet duct 16 to which an induced draft fan (not shown) is connected. As the rotor turns slowly about its axis, the heated plates 14 are moved into the stream of air admitted through the duct 17 to which a forced draft fan (not shown) is connected. After passing over the plates 14 and absorbing heat therefrom the stream of air is conveyed to the boiler furnace or other place of use through a duct 18. A housing 20 enclosing the rotor 10 is provided at either end opposite the latter with end or sector plates 21 which are apertured at 22 and 23 to permit the streams of gas and air to flow through the rotor of the preheater.

In order that the streams of gas and air may not by-pass the heat transfer surface 14 by flowing in the annular clearance space 24 between the rotor shell 10 and the housing 20 it is customary to provide circumferential seals on the shell 10 which wipe against imperforate portions of sector plates 21 or allied parts so as to seal off the space 24 at both ends of the rotor. In accordance with the present invention, the rotor has projecting therefrom at each edge thereof a metallic sealing ring 25 (Figures 2 and 3) slidably mounted on the outer face of the rotor shell 10. These circumferential sealing rings at the top and bottom edges of the rotor are preferably made up of a number of segmental sections 26 (Figures 3 and 4) which are bevelled or rabbetted at their ends so as to overlap and form a complete ring while maintaining a lateral seal between segments. They are made up of metallic strips of arcuate form short enough to be passed through an access port 27 (Figure 3) located in the rotor housing so that they may be installed initially and removed for replacement from the exterior of the preheater.

In the form shown in Figure 2 each sealing segment 26 is pressed against the inner face of the part of the sector plate 21 then opposite it by springs 30 each bearing against a yoke 31 on the segment 26 and a nut 32 on a bolt 33. Bolt 33 is carried by a plate member 34 attached to the rotor shell 10 by a bolt 35 that passes through a slot 36 in segment 26 so that the latter may ride up and down on the circumferential end edge of the rotor as irregularities or distortions are encountered in the supposedly planar machined surface 37 of the sector plate 21. A guide block 38 on bolt 35 rides in slot 36 to prevent the sealing segments 26 being displaced circumferentially along the edge of the rotor.

The sealing segments 26 are pressed radially by plate type springs 40 on the bolts 35 into contact with the side of the rotor 10 and with a pliable circumferentially extending seal strip 41 of glass fabric, or the like, attached to the end edge of the rotor 10 and backed up by a metallic strip 42, the seal 41 and strip 42 being attached to the end edge of the rotor by bolts 43 as well as the bolts 35 associated with guide blocks 38. The strips 41 preclude flow of gas or air in a radial direction through the slots and bolt holes embodied in the mounting of the seals 26 on the end of the rotor shell 10.

The sealing arrangement illustrated in Figure 5 is of generally similar construction to that described above but the seal strip 41A is of tadpole-like cross section being provided with an enlarged head 44 which with the end edge of seal plate 42 seats in a groove 45 in the sealing segments 26A.

With either form the floating sealing segments 26 may be mounted or adjusted on through the access openings 27. In the event the rotor becomes distorted from heat and out of round horizontally or vertically the sealing surfaces 26 remain effective. The backing strips 42 of the seals also provide a straight surface for abutment with the end edges of the radial seals 46.

This application is a substitute for application, Serial No. 119,843, filed October 6, 1949, now abandoned.

What I claim is:

1. In a regenerative heat exchanger or the like comprising a rotor having a cylindrical rotor shell; a stationary casing surrounding said rotor, and sector plates at each end of said casing provided with a plurality of circumferentially spaced apertures for separated flow of different gaseous media through the rotor; support means extending radially through apertures formed in said shell at a plurality of circumferentially spaced points in the extended end edges of said rotor shell; guide blocks attached to said support means radially outward from the extended end edges of said rotor; slidable arcuate sealing shoes together forming a circular sealing ring positioned against the inner face of a portion of each sector plate radially outward of the apertures in said sector plate formed with axially slotted portions slidably engaging said guide blocks for movement in directions towards and away from said sector plate; spring means acting on said seal shoes for yieldingly engaging them with the surface of said sector plate; a circular flexible sealing strip carried by said support means and engaging the inner wall of said rotor adjacent its end edge and contacting the inner faces of said sealing shoes to bridge the gap between the end edge of the rotor and part of said shoes projecting beyond the end edges of the rotor.

2. A circumferential seal as recited in claim 1 wherein a portion of each sealing shoe is axially spaced from the end edge of the rotor shell and formed with a groove facing the latter and receiving the outer perimetral edge of said sealing strip.

3. A circumferential seal as defined in claim 1 wherein said sealing strips bridge the space between the shoes and the extended end edges of the rotor shell.

4. A circumferential seal as recited in claim 1 wherein resilient means carried by said support means maintains the sealing strip in contact with said sealing shoes.

5. A circumferential seal as recited in claim 1 wherein a portion of each sealing shoe is axially spaced from the end edge of the rotor shell and formed with a groove which receives the flexible sealing strip, said sealing strip comprising a pliable fabric portion concentric with a flexible metallic portion.

References Cited in the file of this patent

UNITED STATES PATENTS

| Number | Name | Date |
|---|---|---|
| 2,471,995 | Yerrick et al. | May 31, 1949 |
| 2,517,512 | Tigges et al. | Aug. 1, 1950 |